(12) United States Patent
Borras et al.

(10) Patent No.: US 8,156,320 B2
(45) Date of Patent: Apr. 10, 2012

(54) METHOD AND APPARATUS FOR FAST BOOTING A PORTABLE COMPUTING DEVICE ALLOWING FOR IMMEDIATE OPERATION

(75) Inventors: Jaime A. Borras, Miramar, FL (US); Jose M. Fernandez, Sunrise, FL (US); Zaffer S. Merchant, Parkland, FL (US)

(73) Assignee: Wireless Silicon Group, LLC, Fort Lauderdale, FL (US)

( * ) Notice: Subject to any disclaimer, the term of this patent is extended or adjusted under 35 U.S.C. 154(b) by 619 days.

(21) Appl. No.: 12/207,106

(22) Filed: Sep. 9, 2008

(65) Prior Publication Data
US 2010/0058045 A1    Mar. 4, 2010

Related U.S. Application Data

(63) Continuation-in-part of application No. 12/207,168, filed on Sep. 9, 2008.

(60) Provisional application No. 61/092,329, filed on Aug. 27, 2008.

(51) Int. Cl.
*G06F 9/00* (2006.01)
*G06F 13/00* (2006.01)

(52) U.S. Cl. ................... 713/2; 713/1; 711/103

(58) Field of Classification Search .............. 713/1, 2
See application file for complete search history.

(56) References Cited

U.S. PATENT DOCUMENTS

| 5,519,843 | A | 5/1996 | Moran et al. |
| 6,615,303 | B1* | 9/2003 | Endo et al. ................ 710/260 |
| 6,631,394 | B1* | 10/2003 | Ronkka et al. .............. 718/100 |
| 6,763,458 | B1 | 7/2004 | Watanabe et al. |
| 7,017,004 | B1 | 3/2006 | Calligaro et al. |
| 7,134,118 | B1 | 11/2006 | McNutt |

(Continued)

FOREIGN PATENT DOCUMENTS

GB    2251324 A    7/1992

(Continued)

OTHER PUBLICATIONS

Benavides, T., et al., "The Enabling of an Execute-In-Place Architecture to Reduce the Embedded System Memory Footprint and Boot Time." Journal of Computers, vol. 3, No. 1, pp. 79-89, Jan. 2008.

*Primary Examiner* — Thomas Lee
*Assistant Examiner* — Phil Nguyen
(74) *Attorney, Agent, or Firm* — Patents on Demand, P.A.; Scott M. Garrett; Brian K. Buchheit

(57) ABSTRACT

The present invention discloses a portable computing device (200) including a processor (202), non-volatile memory (206), and a volatile memory (208). An execute in place (XIP) kernel (210) stored in the non-volatile memory is executed immediately upon powering up the device. As the XIP kernel is executed, the processor maintain state and context information (212) in the volatile memory. The XIP kernel includes user interface and application segments, allow the user to perform some functions immediately upon powering up the device. While executing the XIP kernel and full code instantiation (214) is loaded into the volatile memory. The full code instantiation includes identical code as is in the XIP kernel, in addition to other code. Once loaded, execution is switched (412) from the XIP kernel to the full code instantiation, providing full functionality of the device.

28 Claims, 5 Drawing Sheets

U.S. PATENT DOCUMENTS

| | | | |
|---|---|---|---|
| 7,234,052 B2 | 6/2007 | Lee et al. | |
| 7,356,677 B1 * | 4/2008 | Rafizadeh | 713/1 |
| 7,624,260 B2 * | 11/2009 | Ethier et al. | 713/2 |
| 7,689,820 B2 * | 3/2010 | Pierce et al. | 713/2 |
| 7,853,826 B2 * | 12/2010 | Bramley et al. | 714/13 |
| 2002/0078338 A1 * | 6/2002 | Lay et al. | 713/2 |
| 2003/0115443 A1 * | 6/2003 | Cepulis et al. | 713/2 |
| 2004/0225876 A1 * | 11/2004 | Lam | 713/2 |
| 2004/0255283 A1 * | 12/2004 | Rudelic et al. | 717/151 |
| 2005/0132123 A1 | 6/2005 | Glaum et al. | |
| 2005/0132179 A1 | 6/2005 | Glaum et al. | |
| 2005/0182922 A1 * | 8/2005 | Guo et al. | 713/1 |
| 2006/0064576 A1 | 3/2006 | Chen | |
| 2006/0101194 A1 * | 5/2006 | Malueg et al. | 711/103 |
| 2006/0133362 A1 * | 6/2006 | Stein et al. | 370/360 |
| 2007/0043938 A1 | 2/2007 | May et al. | |
| 2007/0112899 A1 * | 5/2007 | Edwards et al. | 707/205 |
| 2007/0233933 A1 | 10/2007 | Wang et al. | |
| 2007/0243937 A1 | 10/2007 | Hernandez | |
| 2007/0294550 A1 | 12/2007 | May et al. | |

FOREIGN PATENT DOCUMENTS

| | | |
|---|---|---|
| JP | 11298550 | 10/1999 |
| JP | 2003167656 | 6/2003 |
| JP | 2004013299 | 1/2004 |
| JP | 2005107938 | 4/2005 |
| WO | 0067132 | 9/2000 |

* cited by examiner

METHOD AND APPARATUS FOR FAST BOOTING A PORTABLE COMPUTING DEVICE ALLOWING FOR IMMEDIATE OPERATION

CROSS REFERENCE TO RELATED APPLICATIONS

This application is related to co-pending application titled "METHOD AND APPARATUS FOR AN ACTIVE LOW POWER MODE OF A PORTABLE COMPUTING DEVICE," which is assigned to the assignee of the present application, filed evenly herewith, and having U.S. patent application Ser. No. 12/207,168, the teachings of which are hereby incorporated by reference in their entirety. This application claims priority to provisional application titled "METHODS AND SYSTEMS FOR ENHANCING A USER EXPERIENCE ON A MOBILE DEVICE USING NON-VOLATILE EXECUTE-IN-PLACE MEMORY," which is assigned to the assignee of the present application and filed evenly herewith, having U.S. Provisional Application No. 61/092,329, filed Aug. 27, 2008, the teachings of which are hereby incorporated by reference in their entirety.

BACKGROUND OF THE INVENTION

The present invention relates to the field of computing devices, and more particularly to the boot up of small, portable computing devices such as personal digital assistants and cell phones.

Portable electronic computing systems have evolved over the years from ROMized embedded systems with a small amount of RAM to the now conventional flash and RAM based systems that more resemble general purpose computing systems, having the ability to store and execute various application programs. The conventional three main factors considered in the design of these systems are cost, size, and power consumption. In recent years, the desire to load and execute application programs and other functions has driven the design towards a general operating system with ability to operate web browsers, portable code such as Java™, and other applications. A Java operating environment for such devices has been standardized, and is known as Java 2 Micro Edition (J2ME).

Presently, conventional small computing devices, including smart cellular phones, personal digital assistants (PDAs), and palm-top computers, use a non-volatile flash memory (NVM) to store a boot kernel and other operating system elements, application software, user interface (UI) elements, and data. This conventional NVM is typically NAND type memory, which makes it block-addressable, and not byte-addressable like RAM or standard ROM. It therefore requires a different bus. Upon start-up, the processor must load the operating kernel from the NVM into RAM, which is connected to the application processor by a separate bus. This arrangement causes a significant load time upon turning on a device before a user can start operating the device. User's notice the long "power up" time while they wait for the device to be ready to use after pressing the "on" button. This wait time can be somewhat annoying, and in emergency situations waiting up to a minute may be critical.

Prior to using NAND flash NVM, other arrangements were used, including ROM. However, ROM doesn't allow the device to be updated, or applications to be installed, so that approach has been discarded. A NOR memory type flash NVM has been used, which is byte-addressable, connected to the same bus as "pseudo-RAM." Pseudo-RAM is a static RAM which is used for applications having low memory demand and which are not sophisticated systems. This arrangement allows "execute in place" (XIP) operation, but NOR type flash is significantly more expensive than NAND flash, and is not as durable (in lifetime write operations), so that approach also fell out of favor.

FIG. 1 shows a block schematic diagram 100 of an architecture for use in present conventional portable devices. A processor 102 is coupled to a NAND type flash NVM 104 via a first bus 106. The processor 102 is further coupled to a dynamic RAM (DRAM) 108 via a second bus 110. Upon powering up the device, the processor begins copying operating system and other instruction code from the flash to the DRAM, and indicated by arrow 112. Often the boot load copied to the DRAM is in compressed form to reduce memory footprint in the flash memory, thus requiring the boot kernel to be decompressed prior to instantiating it in the DRAM. This arrangement allows the device to have a general operating system to allow the addition of new application programs, as well as updates to the system software. It allows for use of less expensive NAND flash memory, as well as low cost DRAM type memory.

However, using two busses requires interface pins on the processor for each of the busses, causing the size of the processor integrated circuit to be larger than if just one bus were used. Additionally using two busses increases power consumption. Furthermore, while the block-addressable NAND flash is less expensive, having to copy from the flash, decompress the data, and copy it to the DRAM takes a substantial amount of time. Therefore there is a need for an architecture that eliminates a bus interface, and reduces the start up time upon powering up the device.

BRIEF SUMMARY OF THE INVENTION

The invention provides, in one embodiment, a method of booting a computing device for immediate use. The method commences by powering up the computing device, including powering up a processor, a non-volatile memory coupled to the processor via a common bus, and a volatile memory coupled to the processor via the common bus. The non-volatile memory contains an execute in place kernel which includes an initial operating system segment, an initial user interface segment, and an initial application segment. The processor commences executing the execute in place kernel in the non-volatile memory immediately after powering up the computing device. The processor further commences maintaining state and context data produced while executing the execute in place kernel in the non-volatile memory. While executing the execute in place kernel, the method further comprises instantiating a full code instantiation or load in the volatile memory. The full code instantiation includes substantially identical code as in the execute in place kernel. The method then commences switching execution from the execute in place kernel to the full code instantiation upon completion of instantiating the full code instantiation in the volatile memory, including vectoring the state and context data to the full code instantiation.

The invention provides in another embodiment a method of booting a communication device. Upon a user powering up the communication device, the method includes executing an execute in place kernel in a non-volatile memory coupled to a processor via a common bus. The processor executes the execute in place kernel, which includes an initial operating system segment, an initial user interface segment, and an initial application segment. Executing the execute in place kernel allows the user to have immediate limited operation of the communication device via a user interface established by the initial user interface segment. The processor commences maintaining state and context information produced while executing the execute in place kernel in a volatile memory coupled to the processor via the common bus. The processor further commences instantiating a full code instantiation, including a full operating system kernel, user interface, and application code, in the volatile memory while executing the execute in place kernel. Once the full code instantiation is loaded, the method then commences switching execution to the volatile memory. The state and context information is vectored over to the execution of the full operating system kernel, user interface, and application code such that switching execution is seamless.

The invention provides in a further embodiment a portable computing device which includes a processor, a volatile memory coupled to the processor via common bus, and a non-volatile memory coupled to the processor via the common bus. An execute in place kernel is stored in the non-volatile memory which is executed by the processor upon initially powering up the portable computing device. The execute in place kernel includes an initial operating system segment, an initial user interface segment, and an initial application segment. Executing the execute in place kernel configures the processor to maintain state and context information produced by executing the execute in place kernel in the volatile memory, and instantiate a full code instantiation in the volatile memory. The full code instantiation includes full versions of the operating system, user interface, and application corresponding to the initial operating system segment, initial user interface segment, and initial application segment. The processor is further configured to switch execution to the volatile memory upon completion of instantiating the full code instantiation. The state and context information is vectored over to execution of the full code instantiation.

DETAILED DESCRIPTION OF THE INVENTION

Figure 1:
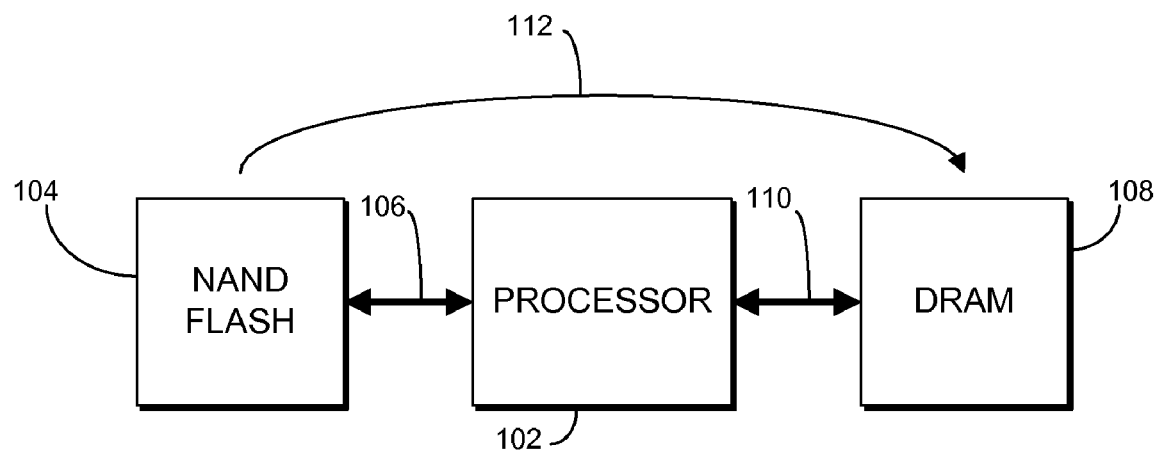
FIG. 1 is a prior art computer architecture for a portable computing device.

The present invention discloses a solution for the problem of long start up times in portable computing devices. More specifically, the invention includes a processor, a non-volatile memory, and a volatile memory all coupled together via a common bus. The non-volatile memory includes an execute in place kernel which the processor is configured to begin executing immediately upon powering up the device. The execute in place kernel includes an operating system segment, user interface segment, and application segment. Once execution of the execute in place kernel commences, a user interface is presented, and a user of the device has access to the applications in the application segment. Since the execute in place kernel is executed immediately upon powering up the device, the user has immediate use of the applications in the application segment. While the execute in place kernel is being executed, the processor maintains state and context information for all processes and applications being executed. The state and context data is maintained in the volatile memory. In addition, as the execute in place kernel is executed, the processor begins copying a full code instantiation into the volatile memory. The full code instantiation includes code elements used in the execute in place kernel, in addition to other software elements. It is the full code needed used to operate the device once the boot process is finished, and allows for the instantiation of additional code, such as other applications or operating environments which is not supported when executing from the execute in place kernel. Once the full code instantiation is instantiated in the volatile memory, execution switches from the non-volatile memory to the volatile memory. The state and context information is vectored to execution of the full code instantiation in the volatile memory to facilitate continuity of execution providing a seamless transition from the boot mode to the fully operational mode. A user of the device is therefore able to immediately use some functions of the device due to the execute in place kernel, and once execution switches to the volatile memory the user will have full operation capability without interruption of any applications in progress.

The power-up boot time for large embedded systems running applications and Graphical UI with large memory footprints, such as in a Smartphone and Mobile Internet Device, can take tens of seconds to respond with the Idle/Home Screen resulting in long wait times and consequently less than optimal user experience. The reason for the long boot-up time is that the application/GUI executable code must first be transferred from Flash-based Non Volatile Memory (NVM) into DRAM before it can start executing.

The embodiments herein significantly reduce the power-up boot time by executing a kernel binary image of the application/GUI code directly out of Flash NVM while a main binary image is copied into DRAM as a background process thereby providing a much faster response for the Idle/Home Screen to the User. The kernel version of the application/GUI code is designed and built specifically to execute-in-place out of Flash NVM and provides the same Idle/Home screen look-and-feel as the main version but implements only a subset of the functionality thereby enabling the user to start interacting with the device much sooner than waiting for the main version to be shadowed from Flash NVM into DRAM. The subset of the full functionality that is implemented in the Flash NVM version can be determined using heuristic methods or can be user selectable. Once a full-resolution version of the main code has been copied into DRAM and the corresponding process has terminated then the instruction pointer control is passed from executing the kernel version out of Flash (NVM) to executing the main code out of DRAM.

In order for a seamless transition from the kernel Flash NVM executable version to the main DRAM executable version, state variables and other related information pertaining to application/GUI is shared between the two processes. This sharing (of state and also context) enables the state machine for the main DRAM version to be configured to start using the same application/GUI context that the kernel Flash NVM version had when it stopped executing, making the transition seamless for the User. This can provide for a consistent GUI between the kernel code and the main code. Additionally, functions that are inactive or disabled while executing from the application kernel in NVM can be "stubbed" or illustrated to indicate temporary inactivity. For example, a video or camera icon can be illustrated as being grayed out while the device is operating the application kernel from the NVM. Alternatively, a waiting symbol (e.g., a clock dial) can be illustrated if a user attempts to activate a function that is temporarily inactive or unavailable during the XIP of the application kernel.

In addition to improving Power-up Boot Time, the embodiments herein also intended to improve Power-Up Resume Time from Low-Battery Hibernate mode. During Low Battery Hibernate, the system stores the OS/application/GUI context into Flash (NVM) before powering down the system to Hibernate and restores it to DRAM when power is restored. Here again, on power-up, the kernel Flash NVM binary image is executed using the previously stored system state and context to speed up the response time for restoring Idle/Home Screen while the main version is being copied from Flash to DRAM. Note the Flash NVM binary image can contain a subset of the main code. In the case of a smartphone, the Flash NVM binary image or application kernel can include code for operating voice, push-to-talk operations and a browser for example. The higher processor or current drain intensive functions such as video or multimedia can be left out of the application kernel.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" "device" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory), a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
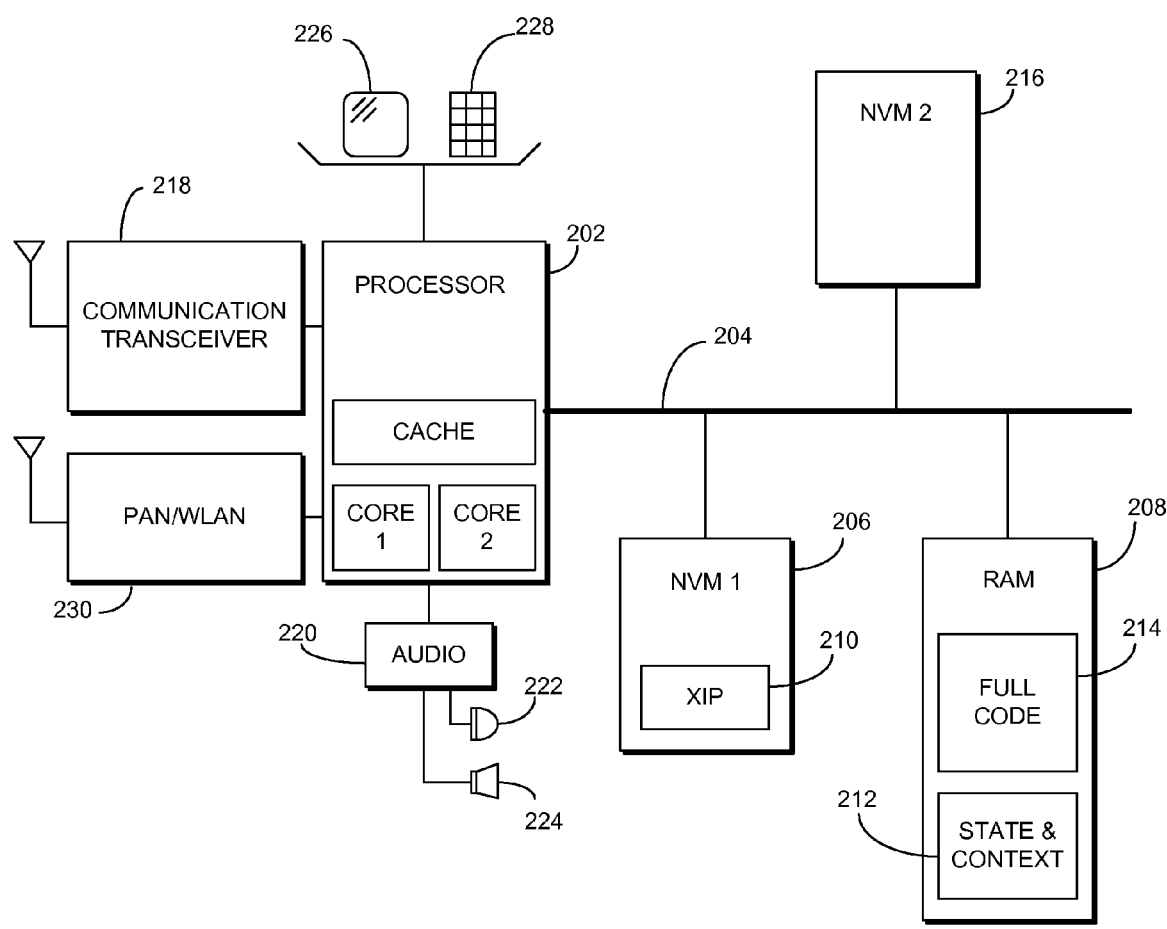
FIG. 2 is a computer architecture for a portable computer device, in accordance with an embodiment of the invention.

Referring now to FIG. 2, here is shown a computer architecture 200 for a portable computer device, in accordance with an embodiment of the invention. A processor 202 is coupled to a common bus 204. A non-volatile memory 206 and volatile memory 208 are further coupled to the common bus 204. The non-volatile memory is byte addressable, and may be implemented by, for example, a NOR type flash memory. The volatile memory may be a dynamic random access memory (DRAM). The volatile memory may conform to the Joint Electron Devices Engineering Council (JEDEC) specification referred to as LP DDR2, which allows a clock speed of up to 533 MHz and an operating voltage of 1.2 volts. Accordingly, the processor 202, common bus 204, and non-volatile memory 206 are configured to operate at the same clock speed and operating voltage as the volatile memory.

To facilitate immediate functionality of the device upon the user powering up the device, the non-volatile memory 206 includes an execute in place (XIP) kernel 210 stored therein. The XIP kernel may alternatively be referred to as an application kernel, and provides, when executed, substantially the same idle/home screen view as is presented during normal operation. The processor 202 is configured to commence execution of the XIP kernel code immediately upon being powered up. The XIP kernel must therefore include basic operating system elements. The XIP is configured to provide limited functionality of the device as the boot process commences, until full functionality is achieved, as will be described. The XIP kernel therefore comprises user interface elements and application elements. The user interface elements provide a user interface which appears substantially the same as the user interface will appear once full functionality is achieved, although some features of the user interface may not be available while executing the XIP kernel. Any function which is not active in the XIP version of the user interface or applications may be shown, but grayed-out to indicate the function is not presently available.

Once execution of the XIP kernel commences, the processor maintains state and context information 212 in the volatile memory. The state and context information is produced during execution of processes and applications of the XIP kernel, as is known. The XIP kernel further configures the processor to commence loading a main or full code instantiation 214 into the volatile memory. The full code instantiation is the full featured version of the user interface and initial applications. It may further include operating system elements, although operating system elements may continue to be executed from the XIP kernel as they do not produce state and context information. The full code instantiation may be loaded from compressed form in the non-volatile memory 206. The XIP kernel therefore acts as a sort of code mirror of the full code instantiation. As the XIP kernel is executed, the full code instantiation is loaded as a background process, shadowing the XIP kernel, but including additional functionality as well. While the main code is loaded, control of the system is maintained while using or executing the kernel code in the non-volatile memory. Once the full code instantiation is instantiated in the volatile memory, execution is switched from the XIP kernel 206 to the full code instantiation 214. Switching execution to the full code instantiation is facilitated by vectoring the state and context information to the appropriate addresses, such that the transition is not substantially noticeable to the user of the device, other than additional functionality becomes available. Thus, seamless continuity of execution is achieved. Any application being executed from the XIP kernel continues being executed, but from identical code in the full code instantiation, along with any additional functionality included in the full code instantiation.

Since, in one embodiment, the non-volatile memory 206 is a NOR type flash memory, which does not typically have the write cycle durability of a NAND flash memory, and since the user may install and uninstall applications and data into the device, it is contemplated that in another embodiment of the invention a second non-volatile memory 216, which is a NAND type flash memory, be used for mass storage. In such an arrangement, the compressed full code instantiation and other code may be stored in compressed form in the second non-volatile memory 216. As the XIP kernel is executed, then, the processor is configured to load the full code instantiation from the second non-volatile memory into the volatile memory.

The device 200 may be any one of a variety of portable computing devices, including personal digital assistants, cellular phones including so called "smart" phones, palm top computers, and on. The exemplary embodiment illustrated in FIG. 2 is that of a communication device, such as cellular phone. Accordingly, the device includes a communication transceiver 218, and an audio processor 220. The communications transceiver includes the necessary baseband processor, modulator and demodulator, amplifier, filters, and antenna to communicate over cellular communication networks. Acoustic signals from, for example, the voice of a user of the device are received at a microphone 222 and converted to a digital audio signal, which may be passed to the communication transceiver for transmission. Similarly, modulated audio signals received by the communication transceiver may be demodulated, and passed to the audio processor, which converts them to analog form to be played over a speaker 224, such as an earpiece speaker.

To facilitate operation of the device, input/output elements such as a graphical display 226 and a keypad 228 and other buttons may be provided. The graphical display present information to the user in visual form, and the keypad allows the user to information into the device, as well as select options presented on the graphical display, as is known.

In the present embodiment, it is expected that user of the device may desire to make a phone call upon powering up the device. Accordingly, one application that will then be included in the XIP kernel is a calling application which allows the user make and receive phone calls. Since the application is included in the XIP kernel, the user will be able to use the device for calling immediately upon powering up the device. The calling application may include access to a phone book or contact list, speed calling, as well as the basic support for carrying out calling activity.

It is further contemplated that the device may include a local or personal area network transceiver 230. The transceiver 230 may be used for a variety of applications, including connecting to data networks, wireless accessories, and so on. Voice calling over data networks may be supported using the transceiver 230.

Figure 3:
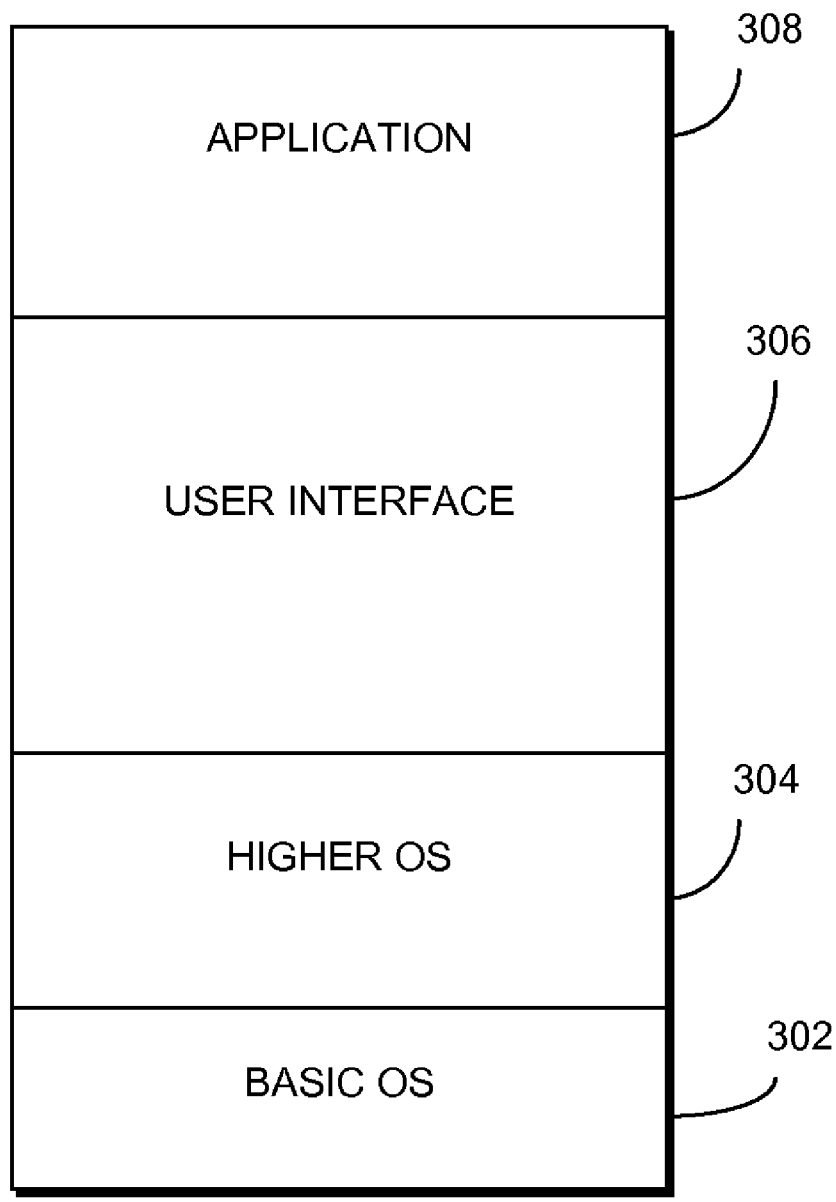
FIG. 3 is a memory diagram of an execute in place kernel, in accordance with an embodiment of the invention.

Referring now to FIG. 3, there is shown a memory diagram of an XIP kernel 210, in accordance with an embodiment of the invention. The XIP kernel includes an initial operating system segment comprised of a basic operating system segment 302 and higher operating system segment 304. The XIP kernel further includes an initial user interface segment 306 and an initial application segment 308. The basic OS segment includes code for establishing, for example, a timing system, basic input and output operation, and so on. Higher OS code provides, for example, higher level operating system support, communication with other components of the device, and the process which loads the full code instantiation into the volatile memory, as well as the code for maintaining state and context information, and code or switching execution to the volatile memory at the appropriate time. The user interface segment includes all user interface elements necessary for presenting the user with a functioning interface, including graphical elements for a graphical user interface, and menuing functions. The user interface segment is designed such that the interface presented is substantially the same as will be presented upon executing the full code instantiation, with the exception that some functions may not be available. Those options which are not available in the XIP kernel user interface may be shown, but grayed out, for example. The application segment 308 includes code for application programs which are to be immediately available to the user. The application code may be size-optimized versions of applications to reduce the memory footprint by removing some functions of the application. As with non-functional user interface elements, non-functional features of applications may be shown, but not active, and grayed out. It is contemplated that the user may select applications to be included in the application segment. The user may have certain favorite applications, such as, for example, and email application. Thus at least one of the applications in the XIP kernel may have been selected by the user during a previous power cycle.

Figure 4:
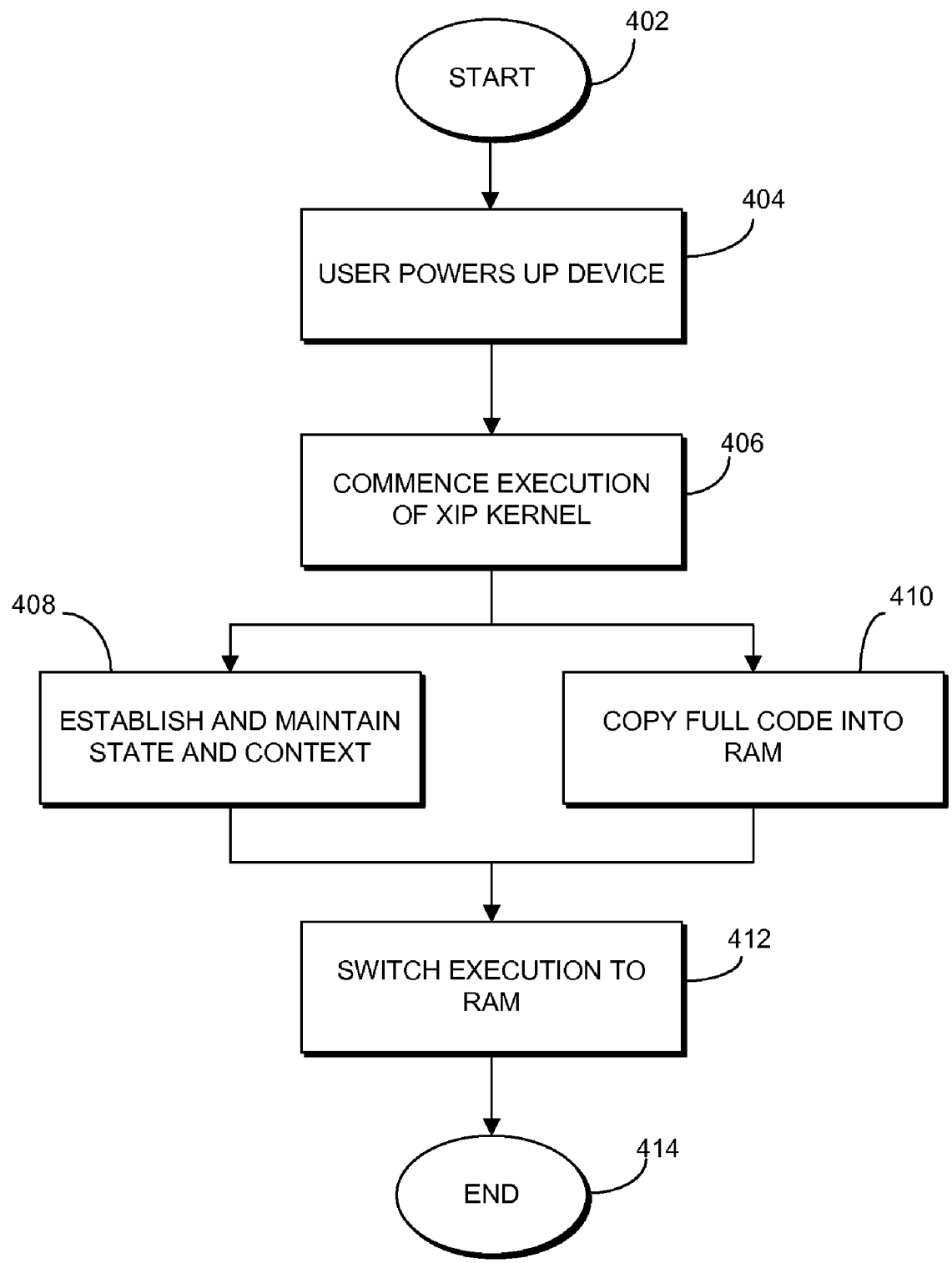
FIG. 4 is a flow chart diagram of a method of booting up a portable computing device, in accordance with an embodiment of the invention.

FIG. 4 is a flow chart diagram of a method 400 of booting up a portable computing device, in accordance with an embodiment of the invention. In one embodiment of the invention the method may be a method of rapid system bootup in an embedded system. At the start 402, the device is powered off, or in a low power/hibernate mode. Accordingly, the user must first power up the device (404), which may include resuming operation from a low power/hibernate mode. Powering up the device may be performed by, for example, pressing a power button, which causes voltage to be applied to various circuits and components of the device, including the processor, non-volatile memory, and the volatile memory. Once the processor, non-volatile memory, and volatile memory are powered up, the processor immediately commences executing the XIP kernel (406), which may include application kernel code as well as graphical user interface code. As the XIP kernel is executed, several processes may be performed in parallel. For example, the processor maintains state and context information in the volatile memory (408). At the same time, the processor commences writing the full code instantiation into the volatile memory (410). In one embodiment of the invention, the processor 202 is a multi-core processor, having 2 cores, for example. A first core may be used for executing the XIP kernel, such as the user interface elements and application elements, while the second core may be used for loading the full code instantiation into volatile memory, with both cores sharing execution of the XIP when necessary. Once the full code instantiation is finished loading in the volatile memory, execution is switched from the non-volatile memory to the full code instantiation in the volatile memory (412). State and context information is vectored to execution of the full code instantiation to facilitate continuity of execution such that applications in process are not interrupted. Applications in the XIP kernel being executed will continue being executed from code in the full code instantiation. Likewise the state of the user interface will remain substantially unchanged, providing a "seamless" transition from the initial boot period to the regular operating mode with full functionality. The complete boot operation is then complete and the method terminates (414).

Figure 5:
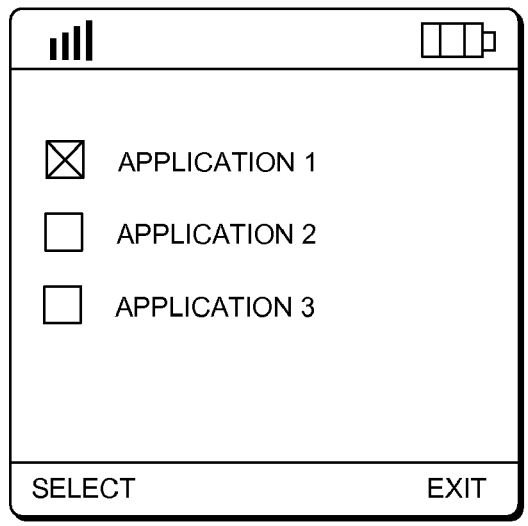
FIG. 5 is user interface for selecting an application to be included in an execute in place kernel, in accordance with an embodiment of the invention.
Figure 6:
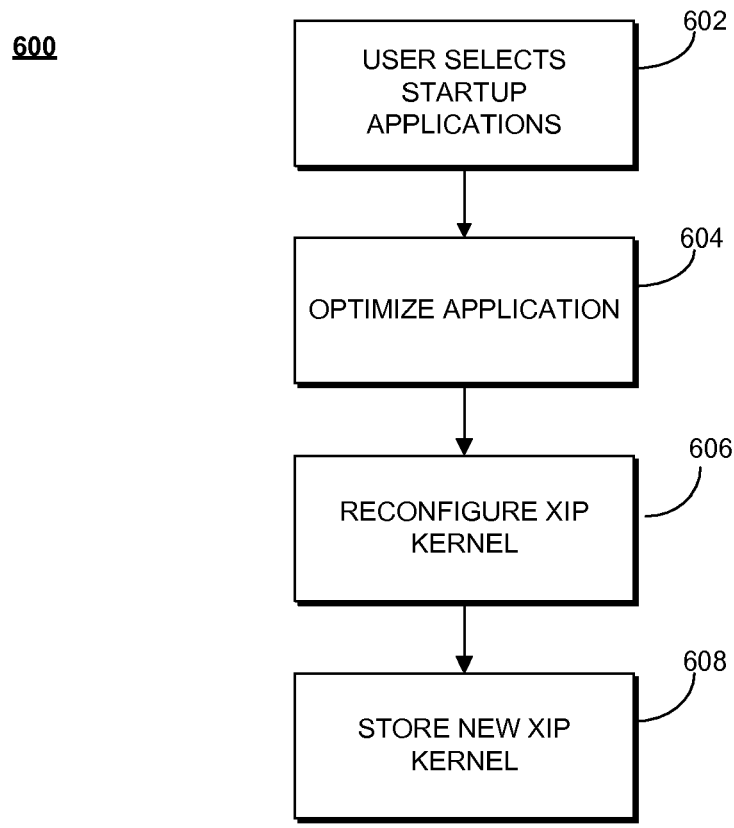
FIG. 6 is a flow chart diagram of a method of selecting an application to be included in an execute in place kernel, in accordance with an embodiment of the invention.

FIG. 5 shows user interface for selecting an application to be included in an execute in place kernel, in accordance with an embodiment of the invention. The user interface shown is exemplary of a cellular phone interface, and is presented during full operation, when the processor is executing from the volatile memory, after the boot period. The user selects an application to indicate which applications are to be included in the XIP kernel. In the present example applications 1-3 are shown, each on its own line with a corresponding selector box. Application 1 has been selected. Accordingly, the code for application 1 may then stored in the XIP kernel. FIG. 6 is a flow chart diagram of a method 600 of selecting an application to be included in the XIP kernel, in accordance with an embodiment of the invention. As indicated in FIG. 5, the user first selects one or more applications to be made available at startup (602). Once the selections are made the application code for each selected application may be optimized for memory space by removing the code for certain features (604). The XIP kernel must then be reconfigured, and rewritten (606), and then stored in the non-volatile memory (608). It is contemplated that the optimization process and reconfiguring may be performed with the aid of a general purpose computer, to which the device may be connected. Thus, the execute in place kernel, upon powering up the device, will have been created apriori based on a user selected preference.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of booting a computing device for immediate use, comprising:

powering up the computing device, including powering up at least one processor, the at least one processor including multiple processing cores, a non-volatile memory coupled to the processor via a common bus, and a volatile memory coupled to the processor via the common bus, wherein the non-volatile memory contains an execute in place kernel, the execute in place kernel including an initial operating system segment, an initial user interface segment, and an initial application segment;

executing the execute in place kernel in the non-volatile memory immediately after powering up the computing device, performed by a first one of the multiple processing cores;

maintaining state and context data in the volatile memory while executing the execute in place kernel, the state and context data produced by the execute in place kernel while executing the execute in place kernel;

while executing the execute in place kernel; instantiating a full code instantiation in the volatile memory, the full code instantiation is a full version of the execute in place kernel, performed by a second one of the multiple processing cores; and switching execution from the execute in place kernel to the full code instantiation upon completion of instantiating the full code instantiation in the volatile memory, including vectoring the state and context data to the full code instantiation.

2. A method of booting a computing device as defined in claim 1, wherein instantiating the full code instantiation is performed by decompressing a compressed version of the full code instantiation stored in the non-volatile memory and copying the full code instantiation to the volatile memory.

3. A method of booting a computing device as defined in claim 1, wherein the non-volatile memory is a NOR type flash memory, instantiating the full code instantiation is performed by decompressing a compressed version of the full code instantiation stored in NAND type flash memory and copying the full code instantiation to the volatile memory, and wherein the NAND type flash memory is coupled to the common bus.

4. A method of booting a computing device as defined in claim 1, wherein the application segment of the execute in place kernel is at least in part selected by a user of the computing device prior to execution of the execute in place kernel via a user interface during full operation of the device.

5. A method of booting a computing device as defined in claim 1, wherein the application segment of the execute in place kernel is at least one application program, the at least one application program being a limited version of a full version of an application program stored in the computing device, instantiating the full code instantiation further comprises instantiating the full version of the application program in the volatile memory.

6. A method of booting a computing device as defined in claim 1, wherein the computing device comprises a cellular phone, the application segment includes a calling application program to facilitate voice calling.

7. A method of booting a computing device as defined in claim 1, wherein the execute in place kernel is created using heuristic methods in a previous power cycle.

8. A method booting a communication device, comprising:
upon a user powering up the communication device, executing an execute in place kernel in a non-volatile memory coupled to at least one processor via common bus, the at least one processor executing the execute in place kernel using a first processing core, the execute in place kernel including an initial operating system segment, an initial user interface segment, and an initial application segment, wherein executing the execute in place kernel allows the user to immediate limited operation of the communication device via a user interface established by the initial user interface segment;

maintaining state and context information in a volatile memory, the state and context information produced by executing the execute in place kernel, the volatile memory coupled to the processor via the common bus;

instantiating a full code instantiation using a second core of the at least one processor, including a full operating system kernel, user interface, and application code, in the volatile memory while executing the execute in place kernel, wherein the full code instantiation is a full version of the execute in place kernel; and switching execution to the volatile memory upon completion of the instantiation, wherein the state and context information is vectored over to, and used by the full operating system kernel, user interface, and application code upon the execution of the full operating system kernel, user interface, and application code such that switching execution is seamless.

9. A method of booting a communication device as defined in claim 8, wherein instantiating the full code instantiation is performed by decompressing compressed versions of the full operating system kernel, user interface, and application code stored in the non-volatile memory and copying them into the volatile memory.

10. A method of booting a communication device as defined in claim 8, wherein the non-volatile memory is a NOR type flash memory, instantiating the full code instantiation is performed by decompressing compressed versions of the full operating system kernel, user interface, and application code are stored in a NAND type flash memory coupled to the common bus and copying them into the volatile memory.

11. A method of booting a communication device as defined in claim 8, wherein the application code in the execute in place kernel is included in the execute in place kernel as a result of a selection of the application code during a prior power cycle.

12. A method of booting a communication device as defined in claim 8, wherein the application code of the execute in place kernel is at least one application program, the at least one application program being a limited version of a full version of an application program stored in the computing device, instantiating the full code instantiation comprises instantiating the full version of the application program in the volatile memory.

13. A method of booting a communication device as defined in claim 12, wherein the application code comprises a calling application program to facilitate voice calling.

14. A method of booting a communication device as defined in claim 8, wherein the execute in place kernel provides a same Idle/Home screen as the full code instantiation but implements only a subset of the functionality of the full code instantiation.

15. A portable computing device, comprising:
at least one processor;
a volatile memory coupled to the at least one processor via common bus;
a non-volatile memory coupled to the at least one processor via the common bus,
an execute in place kernel stored in the non-volatile memory which is executed by a first processing core of the at least one processor upon initially powering up the portable computing device, the execute in place kernel including an initial operating system segment, an initial user interface segment, and an initial application segment, wherein executing the execute in place kernel configures the at least one processor to:
maintain state and context information produced while executing the execute in place kernel in the volatile memory;
instantiate a full code instantiation in the volatile memory using a second processing core of the at least one processor, the full code instantiation comprising full versions of the operating system, user interface, and application corresponding to the initial operating system segment, initial user interface segment, and initial application segment; and
switch execution to the volatile memory upon completion of instantiating the full code instantiation, wherein the state and context information is vectored over to execution of the full code instantiation.

16. A portable computing device as defined in claim 15, wherein the full code instantiation is stored in compressed form in the non-volatile memory and the at least one processor is configured to decompress the full code instantiation to instantiate the full code instantiation into the volatile memory.

17. A portable computing device as defined in claim 15, wherein volatile memory is a NOR flash memory, the full code instantiation is stored in compressed form in a NAND flash memory coupled to the common bus, the at least one processor is configured to decompress the full code instantiation to instantiate the full code instantiation into the volatile memory.

18. A portable computing device as defined in claim 15, wherein the portable device is a communication device, the initial application segment includes a calling application.

19. A portable computing device as defined in claim 15, wherein the initial application segment includes an application selected by a user during a previous power cycle.

20. A portable computing device as defined in claim 15, wherein the at least one processor is further configured to store and share a state and a context between the execute in place kernel and full code instantiation, wherein the state and context are stored in the volatile memory and used from the volatile memory by the full code instantiation.

21. A method of rapid system boot up in an embedded system, comprising: booting and executing an application kernel directly from kernel code in a non-volatile execute in place memory (NVM), performed using a first processor core;
while executing the application kernel, operating the embedded system using the kernel code to provide limited functionality of the embedded system while a main code is loaded to a dynamic random access memory (DRAM) of the embedded system in a background process using a second processor core, wherein the main code is a full version of the kernel code in the NVM;
storing and sharing a state and a context between the application kernel and the main code, wherein the state and context are stored in the DRAM and used from the DRAM by the main code;
passing an instruction pointer control from execution of the kernel code to execution of the main code when a full resolution version of the main code has been copied to the DRAM; and
commencing execution of the main code using the state and context upon passing the instruction pointer control.

22. The method of claim 21, wherein the step of booting the application kernel comprises executing a kernel binary image of an application or GUI code out of a flash non-volatile memory.

23. The method of claim 21, wherein the application kernel provides a same Idle/Home screen as the main code but implements only a subset of the functionality of the main code.

24. The method of claim 21, wherein the embedded system is a communication device, the application kernel includes a calling application.

25. The method of claim 21, wherein the application kernel is created apriori based on a user selected preference in a previous power cycle.

26. The method of claim 21, wherein the application kernel is created using heuristic methods in a previous power cycle.

27. The method of claim 21, wherein executing the application kernel comprises executing the application kernel from a NOR type flash memory.

28. The method of claim 21, wherein the method further comprises:
storing a context and state of an application or GUI or operating system upon a low power hibernate mode before powering down the system using the NVM;
executing the previously stored context and state and restoring a Idle/Home screen from the NVM while the main code is copied from the NVM to the DRAM;
executing the main code from the DRAM upon exiting the low power hibernate mode.

* * * * *